US012585614B2

(12) United States Patent
De et al.

(10) Patent No.: US 12,585,614 B2
(45) Date of Patent: Mar. 24, 2026

(54) PREDICTING OUTAGE CONDITIONS AND HANDLING ARCHIVING

(71) Applicant: International Business Machines Corporation, Armonk, NY (US)

(72) Inventors: Shourav De, Navi Mumbai (IN); Vishal Singha Roy, Hyderabad (IN); Shashidhar Bomma, Hyderabad (IN); Subhash Karemore, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/153,495

(22) Filed: Jan. 12, 2023

(65) Prior Publication Data

US 2024/0330238 A1 Oct. 3, 2024

(51) Int. Cl.
*G06F 16/11* (2019.01)
*G06N 3/084* (2023.01)

(52) U.S. Cl.
CPC ........... *G06F 16/113* (2019.01); *G06N 3/084* (2013.01)

(58) Field of Classification Search
CPC .............................. G06F 16/113; G06N 3/084
See application file for complete search history.

(56) References Cited

U.S. PATENT DOCUMENTS

| | | | |
|---|---|---|---|
| 10,430,437 B2 | 10/2019 | Purushothaman et al. | |
| 10,586,173 B2 | 3/2020 | Hammond et al. | |
| 10,997,015 B2 | 5/2021 | Singh et al. | |
| 11,126,506 B2 | 9/2021 | Martynov et al. | |
| 2017/0220964 A1* | 8/2017 | Datta Ray | ........... H04L 63/1433 |
| 2019/0268283 A1* | 8/2019 | Mukherjee | .......... H04L 67/1008 |
| 2020/0160211 A1 | 5/2020 | Kumar et al. | |
| 2020/0394107 A1 | 12/2020 | Rao et al. | |
| 2021/0304037 A1* | 9/2021 | Penumarthi | ......... H04L 63/1425 |

FOREIGN PATENT DOCUMENTS

CN 102708158 B 3/2014

* cited by examiner

*Primary Examiner* — Aleksandr Kerzhner
*Assistant Examiner* — Samuel C Sharpless, III
(74) *Attorney, Agent, or Firm* — Cantor Colburn LLP; Stephen Yoder

(57) ABSTRACT

A computer-implemented method of data archiving is provided. The computer-implemented method includes predicting when an outage condition of a computing system is likely to occur, taking over control of data archiving from a database management unit of the computing system and archiving data prior to the outage condition taking effect and returning control of the data archiving to the database management unit following termination of the outage condition.

17 Claims, 7 Drawing Sheets

First example : weather event

| Time until outage condition | Compression rate |
|---|---|
| Substantial | Low |

Second example : network traffic increase

| Time until outage condition | Compression rate |
|---|---|
| Medium | Moderate |

Third example : malicious attack

| Time until outage condition | Compression rate |
|---|---|
| Short | High |

FIG. 6

PREDICTING OUTAGE CONDITIONS AND HANDLING ARCHIVING

BACKGROUND

The present invention generally relates to data backups and archiving, and more specifically, to a computer-implemented method of predicting outage conditions and handling archiving problems associated with outage conditions.

In information technology, data backup is a copy of computer data taken from a first location and stored elsewhere so that it may be used to restore the original after a data loss event. Backups can be used to recover data after its loss from deletion or corruption, or to recover data from an earlier time. In that way, backups can sometimes provide a simple form of disaster recovery. Data that is backed up is selected, extracted and manipulated for storage. The process can include methods for dealing with live data, including open files, as well as compression, encryption, and de-duplication. In certain cases, remote backup services or cloud backups involve service providers storing data offsite. This has been used to protect against events such as fires, floods or earthquakes which could destroy locally stored backups. Some cloud-based backups provide a layer of data protection though, ultimately, users must trust the provider to maintain the privacy and integrity of their data.

SUMMARY

Embodiments of the present invention are directed to a computer-implemented method for data archiving. A non-limiting example of the computer-implemented method includes predicting when an outage condition of a computing system is likely to occur, taking over control of data archiving from a database management unit of the computing system and archiving data prior to the outage condition taking effect and returning control of the data archiving to the database management unit following termination of the outage condition.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 is a graphical depiction of various instantiations of the computer-implemented method of FIG. 2 in accordance with one or more embodiments of the present invention.

Figure 1:
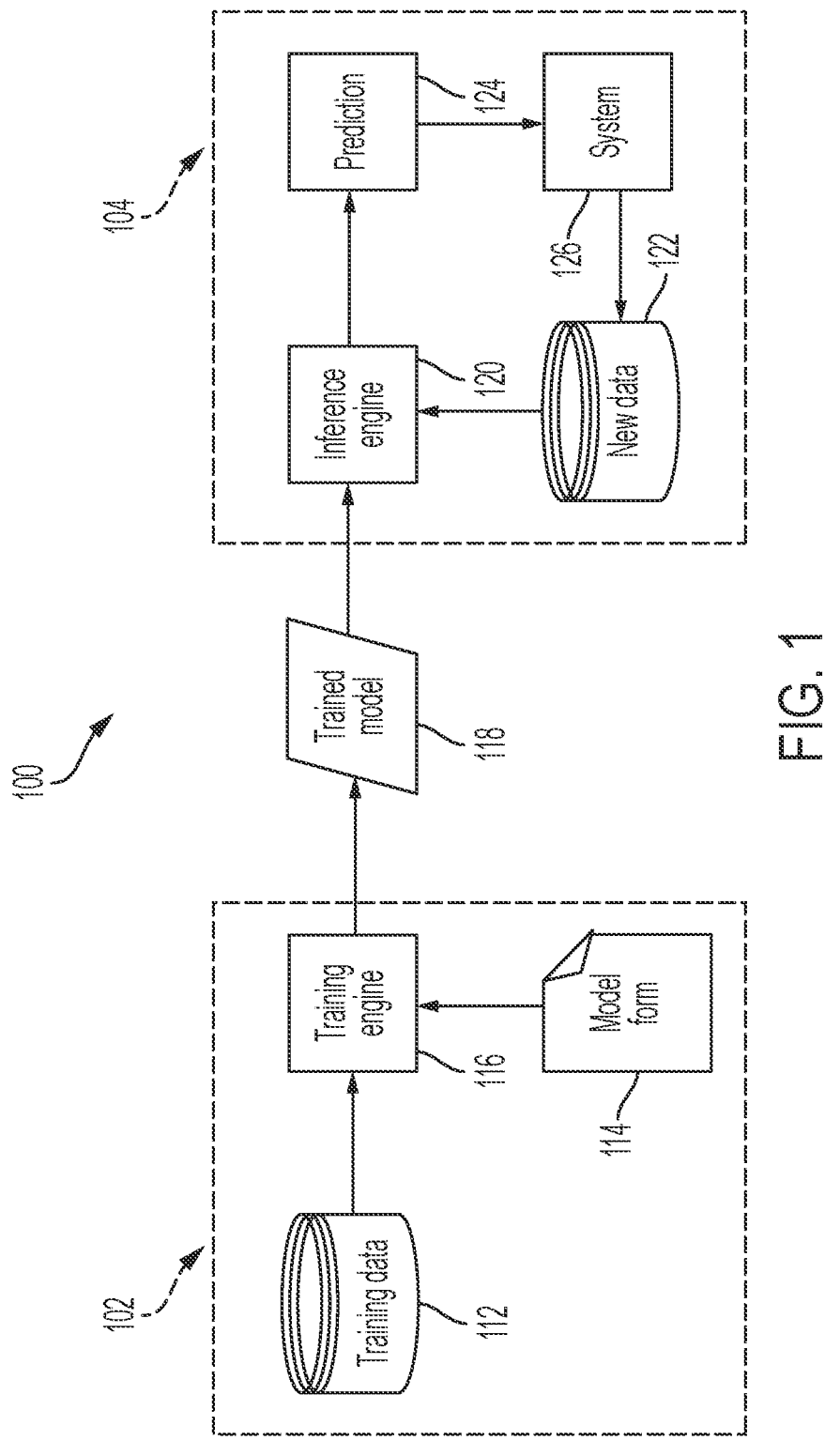
FIG. 1 is a block diagram of components of a machine learning training and inference system according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, in computing technologies, such as enterprise computing, an outage condition refers to a loss of computing resources for a given period of time. An outage condition can be cause by a natural disaster, such as a weather event or a seismic event, human error that leads to a hardware or software bug or power failure, or a malicious attack that can also lead to a hardware or software bug or a power failure. In any case, one of the main problems with outage conditions is that they present a serious risk of data loss.

Often, in enterprise computing systems in particular, data is backed up regularly to ensure that if there is a data loss, at least some valuable data can be recovered. Typically, backup processes are scheduled or responsive to certain conditions, such as when an administrator issues a data backup command. For outage conditions that are not planned, however, data may not be sufficiently backed up due to backup processes not engaging in time. This can lead to data loss, which, in some cases, can be catastrophic.

Turning now to an overview of the aspects of the invention, one or more embodiments of the invention address shortcomings of the above-described approach by providing a method of predicting when an outage condition will be in effect, taking over control of backup processes and archiving from a database to thereby execute backup processes and archiving in a highly compressed format when an outage condition is predicted and returning control to the database when the outage condition is over.

The above-described aspects of the invention address the shortcomings of known approaches by providing an artificial intelligence (AI) engine that receives real-time data describing an operational status of a computing system and compares the real-time data with historical data. Based on results of this comparison, the AI engine predicts whether an outage condition is likely using AI modeling. If an outage condition is likely, the AI engine determines how long until the outage condition is in effect using AI modeling once again. The AI engine then takes over control of backup processes and archiving from a database to thereby execute backup processes and archiving in accordance with the determination of how long until the outage condition takes effect. For example, if the outage condition is predicted to take effect relatively soon, the AI engine will execute backup processes and archiving in a highly compressed format. This will save a significant amount of data in a short period of time. At the conclusion of the outage condition, the AI engine will return control to the database.

Turning now to a more detailed description of aspects of the present invention, FIG. 1 depicts a block diagram of components of a machine learning training and inference system 100. The machine learning training and inference system 100, in accordance with one or more embodiments of the invention, can utilize machine learning techniques to perform tasks, such as managing information during a web conference. More specifically, one or more embodiments of the invention described herein can incorporate and utilize rule-based decision making and artificial intelligence (AI) reasoning to accomplish the various operations described herein, namely collecting and formatting meeting application information at a processor of a computing device having a screen being shared with attendees of the web conference and collecting and formatting to-be-popup application information at the processor as well as analyzing, by the processor, an urgency of the to-be-popup application information and a correlation between the to-be-popup application information and the meeting application information and determining, by the processor, whether to share the to-be-popup application information with a user of the computing device and with the attendees based on results of the analyzing.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to, analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 100 performs training 102 and inference 104. During training 102, a training engine 116 trains a model (e.g., the trained model 118) to perform a task. Inference 104 is the process of implementing the trained model 118 to perform the task in the context of a larger system (e.g., a system 126).

The training 102 begins with training data 112, which can be structured or unstructured data. The training engine 116 receives the training data 112 and a model form 114. The model form 114 represents a base model that is untrained. The model form 114 can have preset weights and biases, which can be adjusted during training. It should be appreciated that the model form 114 can be selected from many different model forms depending on the task to be performed. For example, where the training 102 is to train a model to perform image classification, the model form 114 can be a model form of a CNN (convolutional neural network). The training 102 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 112 includes labeled images, including images of the object of interest with associated labels (ground truth) and other images that do not include the object of interest with associated labels. In this example, the training engine 116 takes as input a training image from the training data 112, makes a prediction for classifying the image, and compares the prediction to the known label. The training engine 116 then adjusts weights and/or biases of the model based on results of the comparison, such as by using backpropagation. The training 102 can be performed multiple times (referred to as "epochs") until a suitable model is trained (e.g., the trained model 118).

Once trained, the trained model 118 can be used to perform inference 104 to perform a task. The inference engine 120 applies the trained model 118 to new data 122 (e.g., real-world, non-training data). For example, if the trained model 118 is trained to classify images of a particular object, such as a chair, the new data 122 can be an image of a chair that was not part of the training data 112. In this way, the new data 122 represents data to which the model 118 has not been exposed. The inference engine 120 makes a prediction 124 (e.g., a classification of an object in an image of the new data 122) and passes the prediction 124 to the system 126. The system 126 can, based on the prediction 124, taken an action, perform an operation, perform an analysis, and/or the like, including combinations and/or multiples thereof. In some embodiments of the invention, the system 126 can add to and/or modify the new data 122 based on the prediction 124.

In accordance with one or more embodiments of the invention, the predictions 124 generated by the inference engine 120 are periodically monitored and verified to ensure that the inference engine 120 is operating as expected. Based on the verification, additional training 102 can occur using the trained model 118 as the starting point. The additional training 102 can include all or a subset of the original training data 112 and/or new training data 112. In accordance with one or more embodiments of the invention, the training 102 includes updating the trained model 118 to account for changes in expected input data.

In accordance with one or more embodiments of the present invention, the machine learning training and inference system 100 of FIG. 1 can be embodied as an AI engine having multiple independent processes on a cloud-based platform, where the multiple independent processes are configured as an independent process wrapped in its own container. As such, multiple instances of the same processes can run simultaneously to scale to handle one or more users to perform actions selected from a group including running multiple training sessions on two or more AI models at the same time, creating two or more AI models at the same time, running a training session on one or more AI models while creating one or more AI models at the same time and any combination of these three. A first service of the independent processes can be configured to handle scaling by dynamically calling in additional computing devices to load on and run additional instances of one or more of the independent processes wrapped in its own container as needed, where using additional instances of one or more of the independent processes wrapped in its own container improves the functionality of the AI engine to allow dynamic scaling for calling in additional computing devices and instances of independent processing compared to having to run a middleman daemon trying coordinate between different processes and needing to run resident on each computing device.

An instructor process can be configured to carry out a training plan codified in a pedagogical software programming language. A learner process can be configured to carry out an actual execution of underlying AI learning algorithms during the training session. The instructor process and the learner process cooperate with one or more data sources to train a new AI model.

Another process of the independent processes is configured to receive scripted code to create a topology of neural networks, to select one or more learning algorithms, and then to instantiate a first AI model assigned with a unique identifier based on a description of a problem to solve codified in a pedagogical software programming language.

The first service can be configured to direct a first central processing unit (CPU) computing device to load and run an architect process, a second CPU computing device to load and run an instructor process, a first general processing unit (GPU) computing device to load and run a learner module, and then change an amount of computing devices running independent processes by dynamically calling in a third CPU computing device to load and run a second instance of the instructor process, and a second GPU computing device to load and run a second instance of the learner module.

A first instance of the independent processes is wrapped into the software container to allow each instance of that independent process to run independently on whatever computing device that instance is running on. The first service can be configured to dynamically change an amount of computing devices overtime running independent processes and to rapidly change the amount to scale to handle multiple users sending multiple AI models to be trained. A second service can be configured to cause a first instance of an instructor process to be instantiated, loaded onto a CPU computing device, and then run on the CPU computing device.

The multiple independent processes can carry out up to four or more separate tasks by interaction with and cooperation between the multiple independent processes, where a first task is creating a shell of an AI model, a second task is loading in a file of scripted code in a programming language to help define a topology of processing nodes in the AI model, a layout of the concepts making up the AI model, and a selection of an appropriate learning algorithm for the AI model, a third task is starting to train the AI model with a data source, and a fourth task is then deploying and using a trained AI model and doing predictions on data from the data source.

The independent processes can include, but are not limited to, a watchman service. This watchman service can be configured to monitor when failures occur in any of the other independent processes and when any of the other independent processes exit, and then to tell the independent processes wrapped in its container to exit the training session in which they were cooperating.

The AI engine can be embodied in a non-transitory machine-readable medium configured to store data and instructions, which, when executed by one or more processors on one or more computing device, causes the above-described operations to execute.

Figure 2:
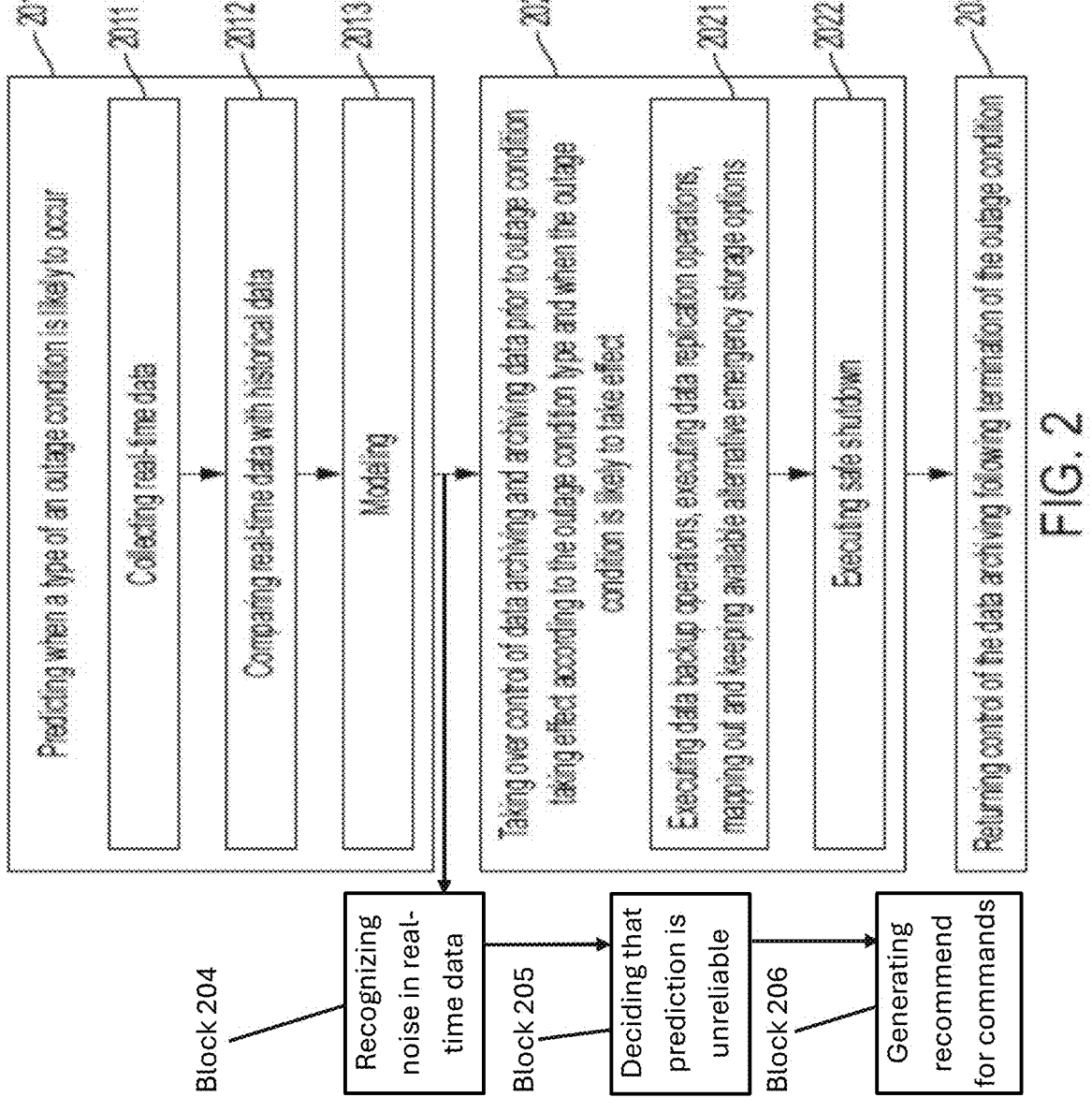
FIG. 2 is a flow diagram illustrating a computer-implemented method of data archiving in accordance with one or more embodiments of the present invention.

With reference to FIG. 2, a computer-implemented method 200 of data archiving is provided and includes predicting when an outage condition of a computing system is likely to occur (block 201), taking over control of data archiving from a database management unit of the computing system and archiving data prior to the outage condition taking effect (block 202) and returning control of the data archiving to the database management unit following termination of the outage condition (block 203).

Figure 3:
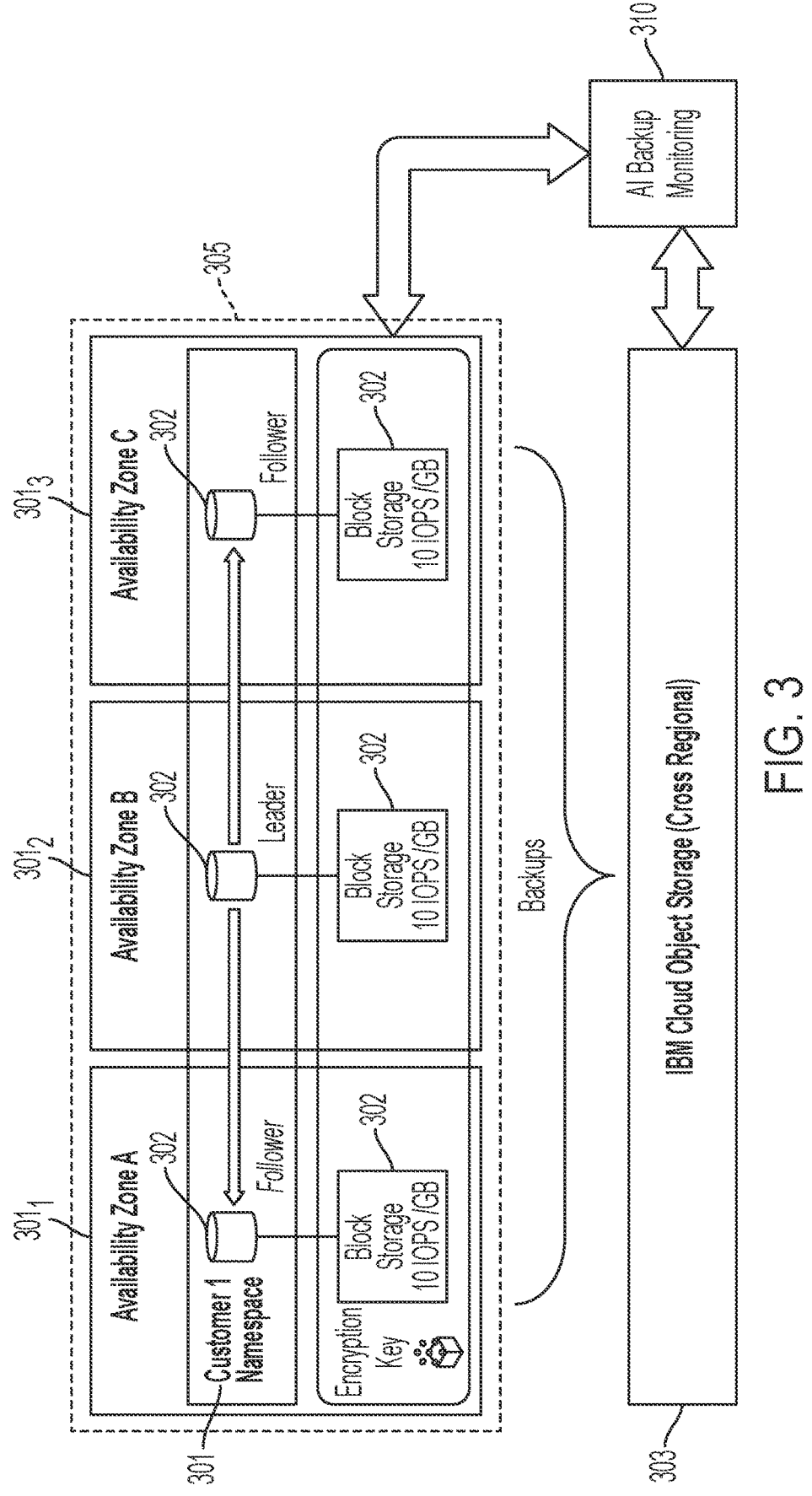
FIG. 3 is a schematic diagram of a computing system in which the computer-implemented method of data archiving of FIG. 2 is deployed in accordance with one or more embodiments of the present invention.
Figure 4:
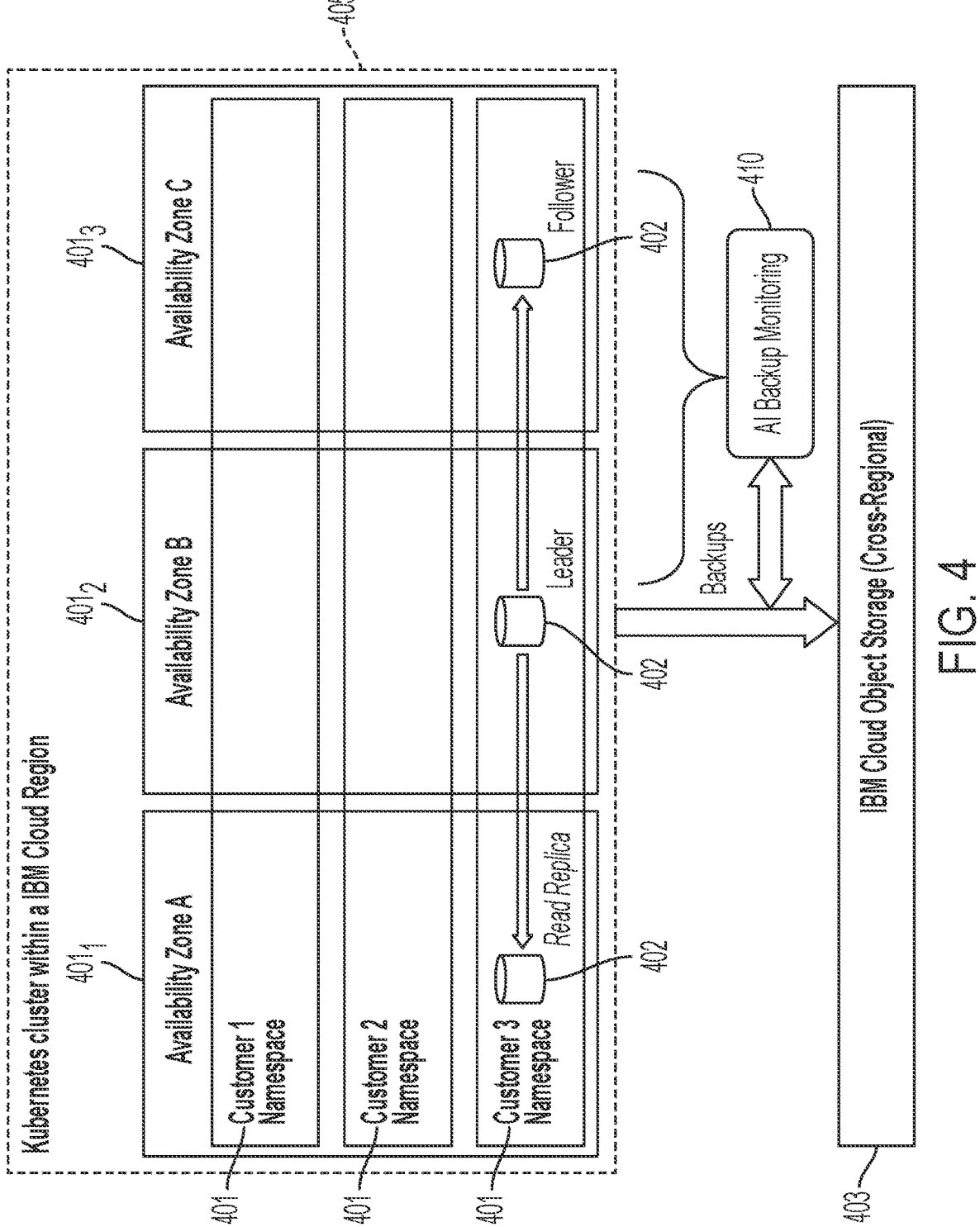
FIG. 4 is a schematic diagram of a computing system in which the computer-implemented method of data archiving of FIG. 2 is deployed in accordance with one or more embodiments of the present invention.
Figure 5:
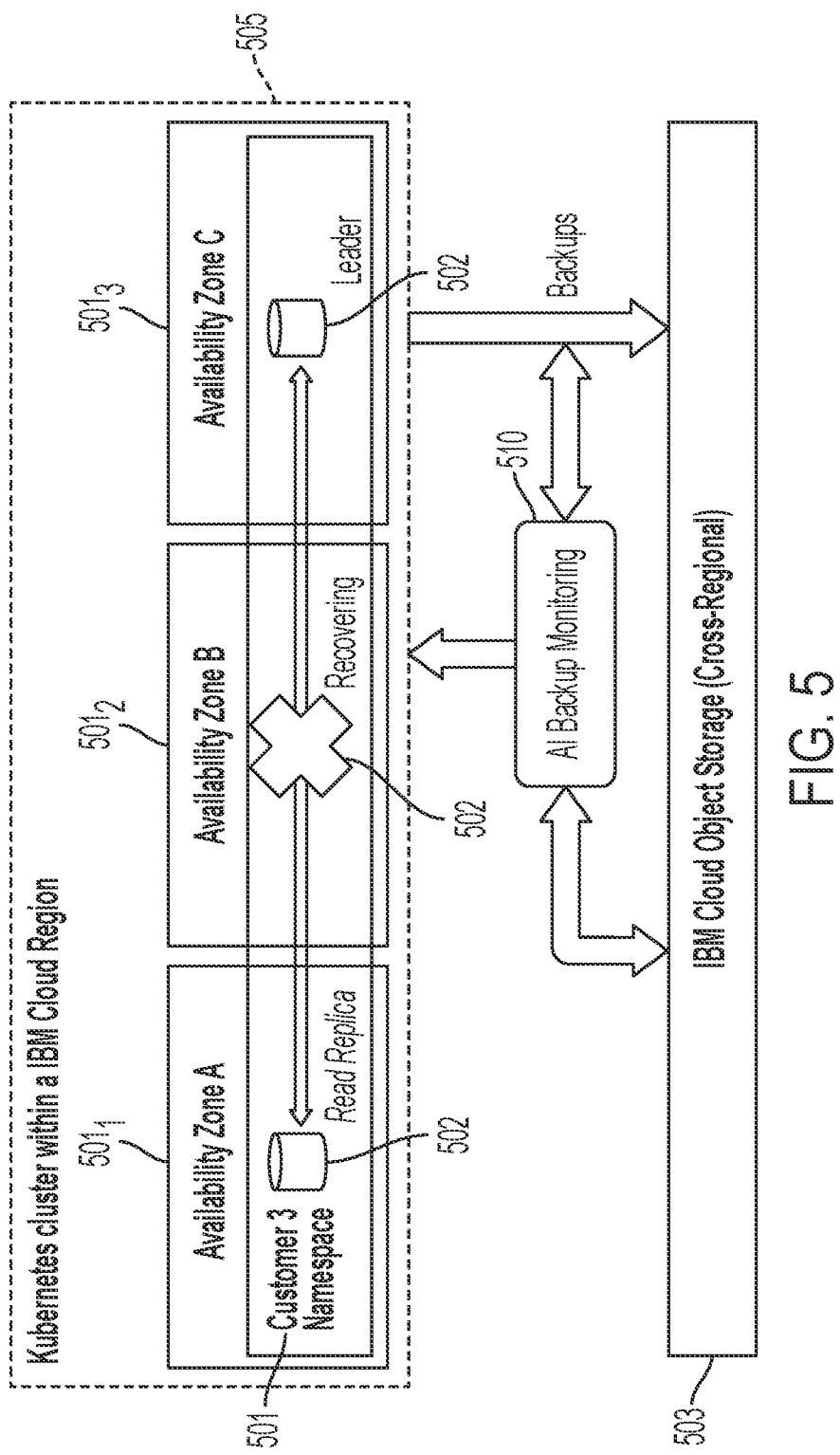
FIG. 5 is a schematic diagram of a computing system in which the computer-implemented method of data archiving of FIG. 2 is deployed in accordance with one or more embodiments of the present invention.

With reference to FIGS. 3, 4 and 5, the computing system of the computer-implemented method 200 can include similar features in varying configurations.

For example, as shown in FIG. 3, the computing system can include computing resources 301 each respectively arranged in a corresponding one of multiple zones 3011, 3012 and 3013 with a local memory unit 302, a remote storage unit 303 used to back up the local memory unit 302 and an AI engine 310. The computing resources 301 are normally controlled by the data management unit of the computer-implemented method 200 (illustrated in FIG. 3 as data management unit 305). The remote storage unit 303 can be provided as a cross-regional cloud storage system. The AI engine 310 is separate from and disposed in signal communication with the computing resources 301 and the remote storage unit 303. The AI engine 310 is configured to execute the computer-implemented method 200 of data archiving of FIG. 2 in cases of outage conditions being predicted and currently in effect. That is, the AI engine 310 is configured to execute the predicting of block 201, the taking over the control of the data archiving and the archiving of the data of block 202 and the returning of the control of block 203.

For another example, as shown in FIG. 4, the computing system can be provided as a Kubernetes cluster and can include computing resources 401 that are each arranged in and across multiple zones 4011, 4012 and 4013 with a local memory unit 402, a remote storage unit 403 used to back up the local memory unit 402 and an AI engine 410. The computing resources 401 are normally controlled by the data management unit of the computer-implemented method 200 (illustrated in FIG. 4 as data management unit 405). The remote storage unit 403 can be provided as a cross-regional cloud storage system. The AI engine 410 is separate from and disposed in signal communication with the computing resources 401 and the remote storage unit 403. The AI engine 410 is configured to execute the computer-implemented method 200 of data archiving of FIG. 2 in cases of outage conditions being predicted and currently in effect. That is, the AI engine 410 is configured to execute the predicting of block 201, the taking over the control of the data archiving and the archiving of the data of block 202 and the returning of the control of block 203.

As another example, as shown in FIG. 5, the computing system can be provided as a Kubernetes cluster with a cloud region and can include a single computing resource 501 that is arranged in and across multiple zones 5011, 5012 and 5013 with a local memory unit 502, a remote storage unit 503 used to back up the local memory unit 502 and an AI engine 510. The single computing resource 501 is normally controlled by the data management unit of the computer-implemented method 200 (illustrated in FIG. 5 as data management unit 505). The remote storage unit 503 can be provided as a cross-regional cloud storage system. The AI engine 510 is separate from and disposed in signal communication with the single computing resource 501 and the remote storage unit 503. The AI engine 510 is configured to execute the computer-implemented method 200 of data archiving of FIG. 2 in cases of outage conditions being predicted and currently in effect. That is, the AI engine 510 is configured to execute the predicting of block 201, the taking over the control of the data archiving and the archiving of the data of block 202 and the returning of the control of block 203.

With reference back to FIG. 2, the predicting of block 201 includes predicting a type of the outage condition and a time when the outage condition is likely to take effect whereas the taking over the control of the data archiving and the archiving of the data of block 202 is executed in accordance with the type of the outage condition and the time when the outage condition is likely to take effect. In greater detail, the predicting of block 201 includes collecting real-time data that is descriptive of a current operational state of the computing system (see, e.g., the computing systems of FIGS. 3-5) in block 2011, comparing the real-time data with corresponding historical data in block 2012 and modeling, by an AI engine (see, e.g., the AI engines 310, 410 and 510 of FIGS. 3-5), a future operational state of the computing system based on a response of the computing system to the historical data and results of the comparing of the real-time data with the historical data in block 2013. In accordance with one or more embodiments of the present invention, the real-time data can include at least one or more of data that is indicative of network errors, storage and hard drive failures, out-of-memory conditions, database errors, lack of bandwidth and replication errors. The taking over the control of the data archiving and the archiving of the data of block 202 can include at least one or more of executing data backup operations, executing data replication operations, mapping out and keeping available alternative emergency storage options in block 2021 as well as executing a safe shutdown of the database with at least one or more of save points and backup points in block 2022.

With reference to FIG. 6, various instantiations of the computer-implemented method 200 of FIG. 2 are illustrated for comparison.

In the first instance, it is assumed that there is a yearly storm affecting an area where the computing system is deployed. Historically, that storm leads to local power losses and thus outage conditions and that the local weather forecasting converges on a time of the yearly storm about one day ahead. Real-time data is collected and the AI engine generates a model based on the historical data and the real-time data which reveals that local weather forecasting is indeed converging toward a forecast that the storm will hit in one day and will likely lead to outage conditions due to power loss. The AI engine thus takes over data archiving control from the database management unit and archives data prior to the storm. In this case, since the storm is forecast a day in advance, the AI engine recognizes that there is sufficient time for a full backup of data and does not command data compression (time until outage condition=high; data compression=low). Once the threat of the storm passes, power is restored and the outage condition terminates or ceases, the AI engine returns control of the data archiving to the database management unit.

In the second instance, it is assumed that there is a periodic substantial increase in network traffic affecting a computing system. Historically, that periodic increase happens at a specific day and time during a business week and is preceded by a slow increase in traffic but ultimately leads to an overflow of traffic and thus outage conditions. Real-time data is collected and the AI engine generates a model based on the historical data and the real-time data which reveals that the periodic substantial increase will occur in less than one hour and will likely lead to outage conditions due to network failure. The AI engine thus takes over data archiving control from the database management unit and archives data prior to the storm. In this case, since the periodic increase in network traffic is forecast in an hour, the AI engine recognizes that there is only sufficient time for a partial backup of certain prioritized data and commands data compression accordingly (time until outage condition=short; data compression=moderate). Once the network traffic rate returns to normal and the network resumes full functionality, the outage condition terminates or ceases and the AI engine returns control of the data archiving to the database management unit.

In the third instance, the AI engine observes that a malicious attack is underway. Historically, similar malicious attacks lead to software and/or hardware errors that in turn lead to failures and outage conditions in very short periods of time. Real-time data is collected and the AI engine generates a model based on the historical data and the real-time data which reveals that the malicious attack is underway and will likely lead to outage conditions due to software and/or hardware failures in only a few seconds. The AI engine thus takes over data archiving control from the database management unit and archives data prior to the storm. In this case, since the software and/or hardware failures are predicted to happen in only a few seconds, the AI engine recognizes that there is only sufficient time for a backup of certain highly prioritized data and commands data compression accordingly (time until outage condition=very short; data compression=high). Once the malicious attack ends and the software and/or hardware failures are corrected, the outage condition terminates or ceases and the AI engine returns control of the data archiving to the database management unit.

An instructor process can be configured to carry out a training plan codified in a pedagogical software programming language, and a learner process is configured to carry out an actual execution of underlying AI learning algorithms during the training session, where the instructor process and the learner process are independent processes that cooperate with one or more data sources to train a new AI model. Another process can be configured to receive scripted code to create a topology of neural networks, dynamically select one or more learning algorithms and then instantiate a first AI model assigned with a unique identifier based on the description of the problem it has been assigned. Each service can be configured to direct a CPU to load and run an architect process, a CPU to run an instructor process, a GPU run a learner module and then change the amount of computing devices running independent processes by dynamically calling in additional computing devices to load and run more instances of the instructor/learner modules as well as instances of the predictive model. As such, and by using the methods described herein, the service (i.e., the AI engine) is configured to dynamically change the number of computing devices over time, each running independent processes as well as rapidly changing the number of running processes to scale to multiple users and data sources as well working as a method to more rapidly compute real time data.

The apparatus described herein can also include a watchman service configured to monitor any of: (1) when failures occur in any of the independent processes, (2) when any of the independent processes exit, and then inform the other co-operating independent processes wrapped in its container to exit the training session in which they were cooperating and (3) restart the processes, if training or predictiveness was incomplete. As such, and by using the methods described herein of running multiple models at the same time, it would allow for faster response times, up to and including response time within milliseconds given sufficient scale and data. This would allow predictions and the taking of actions as follows.

If the prediction is that a malicious attack will result in an outage in milliseconds and the real-time data indicates that the outage is even more imminent, the AI engine stops the backup and executes an immediate safe shutdown. Conversely, if the prediction is for an outage in one day and the real-time data indicates that the outage is even less imminent, the AI engine can halt its custom back up processes and return to normal processing. In addition, with reference back to FIG. 2, the AI engine would also be able to recognize noise in the real-time data (block 204) and to decide that a prediction is inherently unreliable (block 205). In this case, the AI engine would generate a recommendation for various discrete or non-discrete compression rate commands to be engaged as the real-time data changes and becomes more reliable (block 206).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
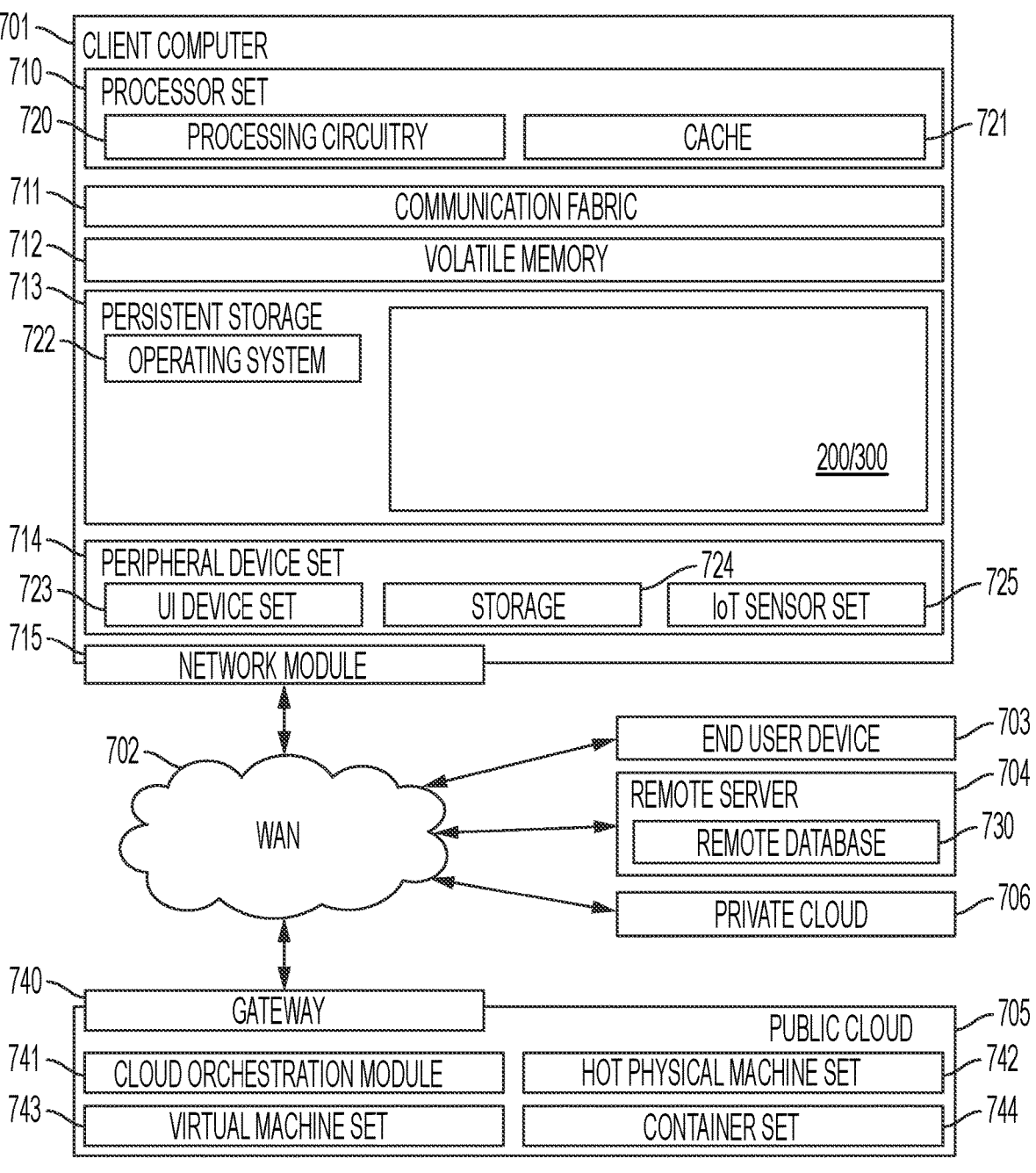
FIG. 7 is a block diagram of a computing environment operable to implement aspects of the invention.

With reference to FIG. 7, a computer or computing device 700 that implements the computer-implemented method 200 of FIG. 2 and the computer-implemented method of FIGS. 2 and 3 in accordance with one or more embodiments of the present invention is provided. The computing system of FIG. 7 contains an example of an environment for the execution of at least some of the computer code involved in performing the inventive methods, such as the block of the computer-implemented method 200 of FIG. 2 for managing information during a web conference. In addition to the computer-implemented method 200, the computing system 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method 200, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the computer-implemented method 200, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the computer-implemented method 200, at least some of the instructions for performing the inventive methods may be stored in the block of the computer-implemented method 200 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block of the computer-implemented method 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of data archiving, comprising:

predicting a type of an outage condition of a computing system and when the outage condition is likely to occur;

taking over control of data archiving from a database management unit of the computing system and archiving data prior to the outage condition taking effect, the archiving of the data comprising:

recognizing, from results of the predicting, that the outage condition is due to a yearly storm event and that local weather forecasting is converging toward a forecast that the yearly storm event will lead to localized power losses and that a time until the outage condition due to the yearly storm event is on the order of a day in advance and sufficient for a full backup of data without data compression and executing a low rate of data compression;

recognizing, from the results of the predicting, that the outage condition is due to a periodic substantial increase in network traffic at a specific day and time that is preceded by a slow increase in network traffic leading to traffic overflow and that a time until the outage condition due to the periodic substantial increase in the network traffic is on the order of an hour in advance and only sufficient for a partial backup of certain prioritized data and executing a moderate rate of data compression; and recognizing, from the results of the predicting, that the outage condition is due to a malicious attack that is underway and leading to failure causing errors and that a time until the outage condition due to the malicious attack that is underway is on the order of milliseconds and only sufficient for a partial backup of certain highly prioritized data and executing a high rate of data compression; and returning control of the data archiving to the database management unit following termination of the outage condition.

2. The computer-implemented method according to claim 1, wherein the computing system is provided as a Kubernetes cluster with a cloud region and comprises:

a single computing resource arranged across multiple zones each with a local memory unit and a remote storage unit, which is provided as a cross-regional cloud storage system remote from the single computing resource, to back up the local memory, the single computing resource being normally controlled by the database management unit;

and an artificial intelligence (AI) engine separate from and disposed in signal communication with the single computing resource and the cross-regional cloud storage system, the AI engine being configured to execute the predicting, the taking over the control of the data archiving and the archiving of the data and the returning of the control, and the AI engine being further configured to recognize noise in real-time data, to decide that the predicting is inherently unreliable and to generate a recommendation for compression rate commands to be engaged as the real-time data changes and becomes more reliable.

3. The computer-implemented method according to claim 2, wherein the predicting comprises:

collecting real-time data that is descriptive of a current operational state of the computing system;

comparing the real-time data with corresponding historical data; and modeling, by the AI engine, a future operational state of the computing system based on a response of the computing system to the historical data and results of the comparing of the real-time data with the historical data.

4. The computer-implemented method according to claim 3, wherein the real-time data comprises data that is indicative of network errors, storage and hard drive failures, out-of-memory conditions, database errors, lack of bandwidth and replication errors.

5. The computer-implemented method according to claim 4, wherein the taking over the control of the data archiving and the archiving of the data comprises executing data backup operations, executing data replication operations, mapping out and keeping available alternative emergency storage options.

6. The computer-implemented method according to claim 5, wherein:

where the outage condition is due to the periodic increase in the network traffic leading to the traffic overflow and the time until the outage condition due to the periodic increase in the network traffic is only sufficient for the partial backup of the certain prioritized data, the archiving of the data further comprises halting the partial backup and returning to normal processing, and where the outage condition is due to the malicious attack that is underway and leading to the failure causing errors, the archiving of the data further comprises stopping the partial backup and executing a safe shutdown of the database with at least one or more of save points and backup points.

7. A computer program product for data archiving, the computer program product comprising one or more computer readable storage media having computer readable program code collectively stored on the one or more computer readable storage media, the computer readable program code being executed by a processor of a computer system to cause the computer system to perform a method comprising:

predicting a type of an outage condition of a computing system and when the outage condition is likely to occur;

taking over control of data archiving from a database management unit of the computing system and archiving data prior to the outage condition taking effect, the archiving of the data comprising:

recognizing, from results of the predicting, that the outage condition is due to a yearly storm event and that local weather forecasting is converging toward a forecast that the yearly storm event will lead to localized power losses and that a time until the outage condition due to the yearly storm event is on the order of a day in advance and sufficient for a full backup of data without data compression and executing a low rate of data compression;

recognizing, from the results of the predicting, that the outage condition is due to a periodic substantial increase in network traffic at a specific day and time that is preceded by a slow increase in network traffic leading to traffic overflow and that a time until the outage condition due to the periodic substantial increase in the network traffic is on the order of an hour in advance and only sufficient for a partial backup of certain prioritized data and executing a moderate rate of data compression; and recognizing, from the results of the predicting, that the outage condition is due to a malicious attack that is underway and leading to failure causing errors and that a time until the outage condition due to the malicious attack that is underway is on the order of milliseconds and only sufficient for a partial backup of certain highly prioritized data and executing a high rate of data compression; and returning control of the data archiving to the database management unit following termination of the outage condition.

8. The computer program product according to claim 7, wherein the computing system is provided as a Kubernetes cluster with a cloud region and comprises:

a single computing resource arranged across multiple zones each with a local memory unit and a remote storage unit, which is provided as a cross-regional cloud storage system remote from the single computing resource, to back up the local memory, the single computing resource being normally controlled by the database management unit;

and an artificial intelligence (AI) engine separate from and disposed in signal communication with the single computing resource and the cross-regional cloud storage system, the AI engine being configured to execute the predicting, the taking over the control of the data archiving and the archiving of the data and the returning of the control, and the AI engine being further configured to recognize noise in real-time data, to decide that the predicting is inherently unreliable and to generate a recommendation for compression rate commands to be engaged as the real-time data changes and becomes more reliable.

9. The computer program product according to claim 8, wherein the predicting comprises:

collecting real-time data that is descriptive of a current operational state of the computing system;

comparing the real-time data with corresponding historical data; and modeling, by the AI engine, a future operational state of the computing system based on a response of the computing system to the historical data and results of the comparing of the real-time data with the historical data.

10. The computer program product according to claim 9, wherein the real-time data comprises data that is indicative of network errors, storage and hard drive failures, out-of-memory conditions, database errors, lack of bandwidth and replication errors.

11. The computer program product according to claim 10, wherein the taking over the control of the data archiving and the archiving of the data comprises executing data backup operations, executing data replication operations, mapping out and keeping available alternative emergency storage options.

12. The computer program product according to claim 11, wherein:

where the outage condition is due to the periodic increase in the network traffic leading to the traffic overflow and the time until the outage condition due to the periodic increase in the network traffic is only sufficient for the partial backup of the certain prioritized data, the archiving of the data further comprises halting the partial backup and returning to normal processing, and where the outage condition is due to the malicious attack that is underway and leading to the failure causing errors, the archiving of the data further comprises stopping the partial backup and executing a safe shutdown of the database with at least one or more of save points and backup points.

13. A computing system comprising:

a processor;

a memory coupled to the processor; and one or more computer readable storage media coupled to the processor, the one or more computer readable storage media collectively containing instructions that are executed by the processor via the memory to implement a method comprising:

predicting a type of an outage condition of a computing system and when the outage condition is likely to occur;

taking over control of data archiving from a database management unit of the computing system and archiving data prior to the outage condition taking effect, the archiving of the data comprising:

recognizing, from results of the predicting, that the outage condition is due to a yearly storm event and that local weather forecasting is converging toward a forecast that the yearly storm event will lead to localized power losses and that a time until the outage condition due to the yearly storm event is on the order of a day in advance and sufficient for a full backup of data without data compression and executing a low rate of data compression;

recognizing, from the results of the predicting, that the outage condition is due to a periodic substantial increase in network traffic at a specific day and time that is preceded by a slow increase in network traffic leading to traffic overflow and that a time until the outage condition due to the periodic substantial increase in the network traffic is on the order of an hour in advance and only sufficient for a partial backup of certain prioritized data and executing a moderate rate of data compression; and recognizing, from the results of the predicting, that the outage condition is due to a malicious attack that is underway and leading to failure causing errors and that a time until the outage condition due to the malicious attack that is underway is on the order of milliseconds and only sufficient for a partial backup of certain highly prioritized data and executing a high rate of data compression; and returning control of the data archiving to the database management unit following termination of the outage condition.

14. The computing system according to claim 13, wherein the computing system is provided as a Kubernetes cluster with a cloud region and comprises:

a single computing resource arranged across multiple zones each with a local memory unit and a remote storage unit, which is provided as a cross-regional cloud storage system remote from the single computing resource, to back up the local memory, the single computing resource being normally controlled by the database management unit;

and an artificial intelligence (AI) engine separate from and disposed in signal communication with the single computing resource and the cross-regional cloud storage system, the AI engine being configured to execute the predicting, the taking over the control of the data archiving and the archiving of the data and the returning of the control, and the AI engine being further configured to recognize noise in real-time data, to decide that the predicting is inherently unreliable and to generate a recommendation for compression rate commands to be engaged as the real-time data changes and becomes more reliable.

15. The computing system according to claim 14, wherein the predicting comprises:

collecting real-time data that is descriptive of a current operational state of the computing system;

comparing the real-time data with corresponding historical data; and modeling, by the AI engine, a future operational state of the computing system based on a response of the computing system to the historical data and results of the comparing of the real-time data with the historical data, wherein the real-time data comprises data that is indicative of network errors, storage and hard drive failures, out-of-memory conditions, database errors, lack of bandwidth and replication errors.

16. The computing system according to claim 15, wherein the taking over the control of the data archiving and the archiving of the data comprises executing data backup operations, executing data replication operations, mapping out and keeping available alternative emergency storage options.

17. The computing system according to claim 16, wherein:

where the outage condition is due to the periodic increase in the network traffic leading to the traffic overflow and the time until the outage condition due to the periodic increase in the network traffic is only sufficient for the partial backup of the certain prioritized data, the archiving of the data further comprises halting the partial backup and returning to normal processing, and where the outage condition is due to the malicious attack that is underway and leading to the failure causing errors, the archiving of the data further comprises stopping the partial backup and executing a safe shutdown of the database with at least one or more of save points and backup points.

* * * * *